United States Patent
Frid et al.

(10) Patent No.: US 6,449,847 B1
(45) Date of Patent: Sep. 17, 2002

(54) METHOD OF PREVENTING UNAUTHORIZED DRIVING OF A VEHICLE

(76) Inventors: Gregory Frid, 6381 Yellowstone Blvd., Apt. 3H, Forrest Hills, NY (US) 11375; Michael Frid, 175 N. Beacon St., Apt. 11, Brighton, MA (US) 02135

( * ) Notice: Subject to any disclaimer, the term of this patent is extended or adjusted under 35 U.S.C. 154(b) by 0 days.

(21) Appl. No.: 09/783,211

(22) Filed: Feb. 15, 2001

(51) Int. Cl.⁷ .............................................. B21D 53/26
(52) U.S. Cl. ........................ 29/894.1; 74/552; 70/182
(58) Field of Search ...................... 29/894.1; 74/552; 70/182–189

(56) References Cited

U.S. PATENT DOCUMENTS 5,103,660 A * 4/1992 Johnson ....................... 74/552
5,553,888 A * 9/1996 Turner et al. ................. 74/552

* cited by examiner

*Primary Examiner*—P. W. Echols
(74) *Attorney, Agent, or Firm*—I. Zborovsky

(57) ABSTRACT

A method of preventing unauthorized driving of vehicle including providing a steering column and a steering wheel; connecting the steering wheel with the steering column for driving; disconnecting the steering wheel from the steering column when a driving is no longer needed and a driver wants to remove the steering wheel so that it can not be used by an unauthorized person; and forming a connecting unit for connecting the steering wheel to the steering column so that the connecting unit is designed individually for each vehicle, and once the steering wheel of a vehicle is removed from the steering column, any different steering wheel can not be connected with the steering column.

12 Claims, 3 Drawing Sheets

METHOD OF PREVENTING UNAUTHORIZED DRIVING OF A VEHICLE

BACKGROUND OF THE INVENTION

The present invention relates to a method for preventing an unauthorized driving of a vehicle, such as a car, a boat, and the like.

It is known that vehicles sometimes are stolen, and then they are driven away by a thief. It is therefore advisable to provide a method for preventing an unauthorized driving of a stolen vehicle. Several methods have been developed. It is believed that they can be further improved.

SUMMARY OF THE INVENTION

Accordingly, it is an object of the present invention to provide a new, improved method of this type.

In keeping with these objects and with others which will become apparent hereinafter, one feature of present invention resides, briefly stated, in a method for preventing an unauthorized driving of vehicle, which includes providing a steering column and a steering wheel; connecting said steering wheel with said steering column for driving; disconnecting said steering wheel from said steering column when a driving is no longer needed and a driver wants to remove the steering wheel so that it can not be used by an unauthorized person; and forming connecting means for connecting said steering wheel to said steering column so that said connecting means is designed individually for each vehicle, and once the steering wheel of a vehicle is removed from the steering column, any different steering wheel can not be connected with the steering column.

When the method is performed in accordance with the present invention, the steering wheel is removed and other steering wheels can not be attached to the steering column and therefore a vehicle can not be driven by an unauthorized person.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
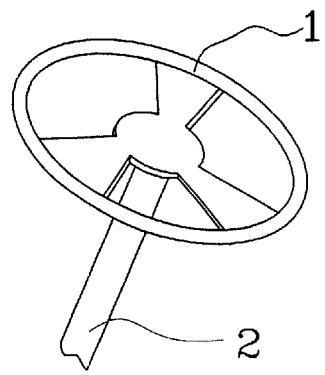
FIG. 1 is a view schematically showing a steering wheel on a steering column of a vehicle.

A method for preventing an unauthorized driving of a vehicle in accordance with the present invention includes the use of a steering wheel which is identified as a whole with reference numeral 1 and is attached to a steering column which is identified with reference numeral 2. The steering wheel is connected to the steering column 2 by connecting means. In accordance with the present invention the connecting means which is identified as a whole with reference numeral 3 is formed so that a driver can remove the steering wheel 1 from the steering column 2 and take it away with him from the car. The connecting means 3 can be formed for example by splines 4 provided at the end part of the steering column and splines 5 provided in the hub of the steering wheel 1 and engageable with splines 4.

Figure 2:
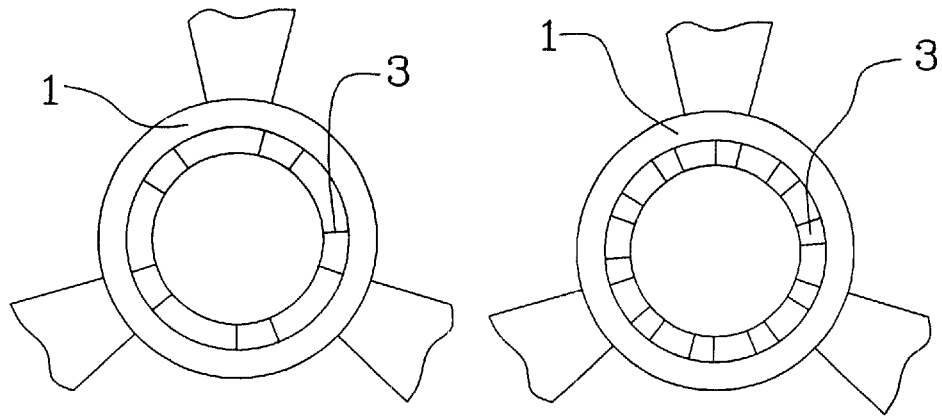
FIG. 2 is a view showing connecting means formed for performing a method in accordance with the present invention.
Figure 2:
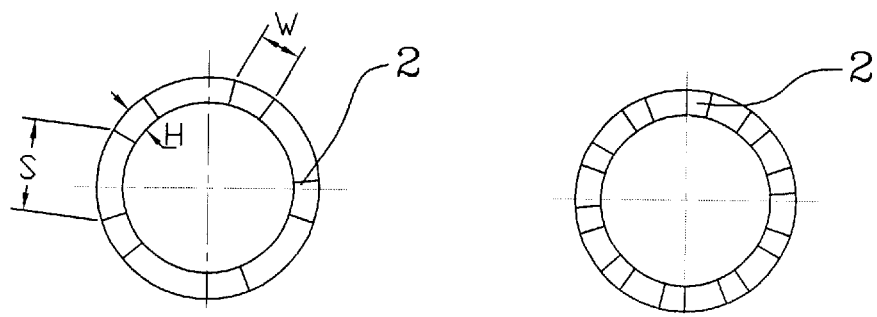
Figure 3:
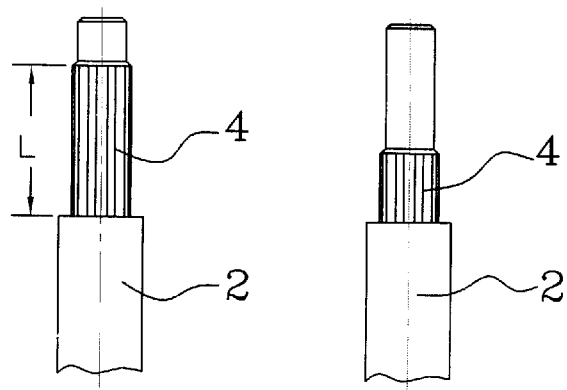
FIG. 3 is a view showing another embodiment of the connecting means used in the inventive method.
Figure 4:
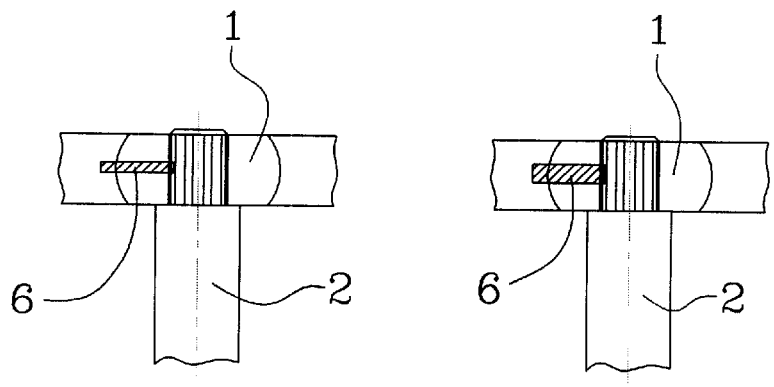
FIG. 4 is a view showing schematically showing a fastening of the steering wheel to the steering column in accordance with the inventive method.

In accordance with the present invention the connecting means 3 for different vehicles are formed differently. As a result, when the driver takes the steering wheel 1 with him from the vehicle, no other steering wheel can be attached to the steering column for driving of the vehicle. For this purpose the splines 4, 5 for one vehicle are formed differently than the splines 4, 5 for the other vehicle, and the splines 4, 5, for each vehicle are individualized and have their own construction which is different from the construction of the splines on all other vehicles. In particular, as shown in FIG. 2 the height of the splines H, the width of the splines W and the spacing between the splines S can be made different for different vehicles. Either one of these parameters can be different, or two, or all of them can be different to make sure that an unauthorized person will not be able to install another steering wheel on the steering column. It is also possible that the length L of the spline 4, 5, as shown in FIG. 3 can be different for different vehicles, along or in combination with the different parameters shown in FIG. 2.

When the steering wheel is installed on the steering column and connected with it, for example by splines, a fixing element identified with reference numeral 6 fixes the connection. The fixing element 6 can be formed as a fixator. In accordance with the present invention the fixator 6 for different vehicles can be also made differently. They can have either a different construction or a different width, or a different length, and the same is true for the corresponding receptacle in which the fixator 6 is introduced. Therefore an unauthorized person who manages to put the steering wheel on the steering column with some efforts will not be able to fix the steering wheel to the steering column. This additionally enhances the prevention of driving of a vehicle by an unauthorized person.

Figure 5:
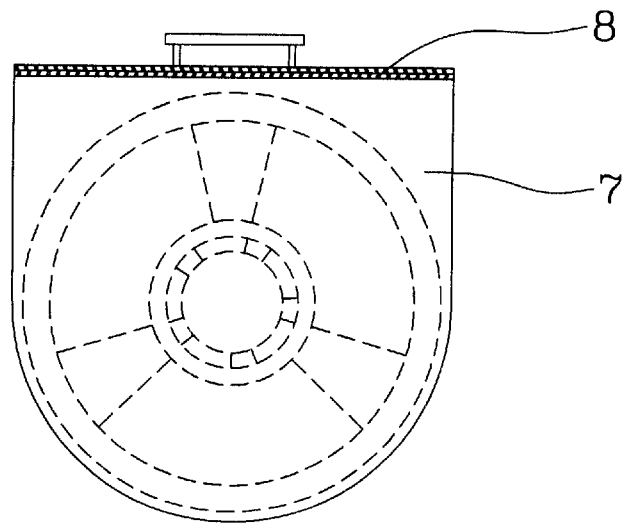
FIG. 5 is a view showing a storing means for the removed steering wheel.

The removed wheel, for convenience of the driver, and further safety can be stored in storing means. One of said storing means is shown in FIG. 5 and identified with reference numeral 7. The storing means shown in FIG. 5 is a bag in which the steering wheel can be inserted, and then bag is closed by closing means 8, formed for example as a zipper.

Figure 6:
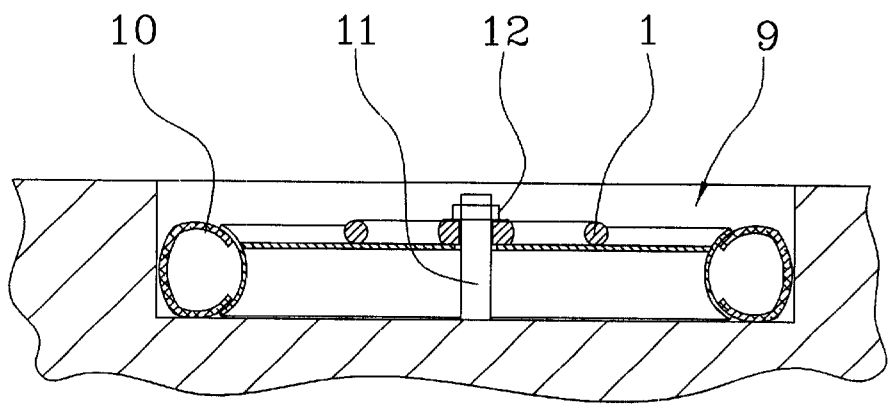
FIG. 6 is a view showing another embodiment of the storing means for the removed steering wheel.

The storing means can be formed in a different manner. For example, the removed steering wheel can be stored in a receptacle 9 which is formed in a trunk of a car for storing a spare tire 10 as shown in FIG. 6. The steering wheel can be placed on top of the spare tire or on top of a cover which covers the spare tire 10. The spare tire 10 is usually arranged on a projection 11 with a nut 12 which is screwed on a thread of the projection 11 to hold the spare tire in the receptacle 9. In accordance with the present invention the thread of the projection 11 and the nut 12 can be formed as a spline connection, in exact correspondence with the splines 4, 5, of the connecting means between the steering wheel and the steering column of the same vehicle. Therefore, the steering wheel can be placed on the projection 11 with interengagement of the splines, and then tightened by the nut 12.

Figure 7:
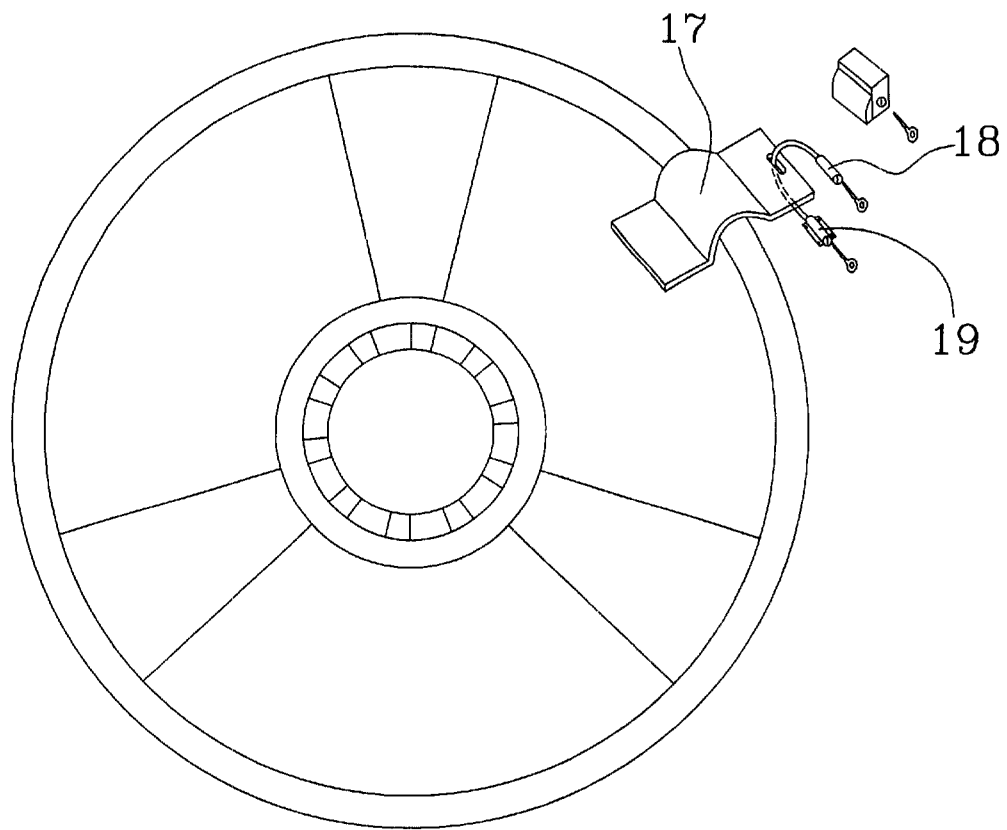
FIG. 7 shows another embodiment of the invention.

As shown in FIG. 7 the steering wheel can be held by a removable bracket 17 which is lockable and unlockable by a turnable lock 18 or rectilinearly displaceable lock 19.

It will be understood that each of the elements described above, or two or more together, may also find a useful application in other types of methods and constructions differing from the types described above.

While the invention has been illustrated and described as embodied in a method of preventing unauthorized driving of a vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A method of preventing unauthorized driving of a vehicle, comprising the steps of providing a steering column and a steering wheel; connecting said steering wheel with said steering column for driving; disconnecting said steering wheel from said steering column when a driving is no longer needed and a driver wants to remove the steering wheel so that it can not be used by an unauthorized person; and preventing unauthorized driving of the vehicle by forming first splines directly on said steering column and second splines directly on said steering wheel which first and second splines of said steering column and said steering wheel directly engage with one another without intermediate elements and are designed individually for each vehicle and once the steering wheel of a vehicle is removed from the steering column, any different steering wheel can not be connected with the steering column, because said first splines directly provided on a different steering wheel will not directly engage with said second splines provided directly on said steering column of the vehicle.

2. A method as defined in claim 1, wherein said splines on different steering wheels and steering columns have different widths of the splines.

3. A method as defined in claim 1, wherein said splines on different steering wheels and steering columns have different lengths of the splines.

4. A method as defined in claim 1; and further comprising fixing means for fixing the steering wheel and the steering column after the connection of the steering wheel with the steering column, said fixing means for different steering vehicles having different constructions.

5. A method as defined in claim 4, wherein said fixing means include a fixator, said fixators for different vehicles having different constructions.

6. A method as defined in claim 1; and further comprising means for storing the steering wheel which is removed from the steering column by a user.

7. A method as defined in claim 6, wherein said steering means includes a bag in which the steering wheel can be introduced and carried by the user.

8. A method as defined in claim 6, wherein said steering means includes a compartment in the vehicle in which the steering wheel can be introduced.

9. A method as defined in claim 7, wherein said compartment corresponds to a compartment in which a spare tire is held and which is provided with a central projection.

10. A method as defined in claim 9, wherein said projection being provided with a connecting element which is individual from the steering wheel of the vehicle so that the removed steering wheel can be attached to said connecting element only of the same vehicle.

11. A method as defined in claim 1; and further comprising a lockable and unlockable bracket adapted to hold the steering wheel; and a lock provided therefor.

12. A method as defined in claim 1, wherein said splines on different steering wheels and steering columns have different parameters selected from the group consisting of a different height of the splines, a different width of the splines, and a different spacing between the splines, two above mentioned different parameters, and three above mentioned different parameters.

* * * * *